United States Patent
Fujita et al.

(10) Patent No.: US 9,079,773 B2
(45) Date of Patent: Jul. 14, 2015

(54) OZONE GENERATING APPARATUS

(75) Inventors: Tomio Fujita, Hyogo (JP); Hitoshi Nagao, Hyogo (JP); Shiro Yamauchi, Hyogo (JP)

(73) Assignee: TADA ELECTRIC CO., LTD., Hyogo (JP)

( * ) Notice: Subject to any disclaimer, the term of this patent is extended or adjusted under 35 U.S.C. 154(b) by 61 days.

(21) Appl. No.: 13/145,642

(22) PCT Filed: May 28, 2009

(86) PCT No.: PCT/JP2009/059795
§ 371 (c)(1),
(2), (4) Date: Jul. 21, 2011

(87) PCT Pub. No.: WO2010/137153
PCT Pub. Date: Dec. 2, 2010

(65) Prior Publication Data
US 2011/0280774 A1  Nov. 17, 2011

(51) Int. Cl.
*B01J 19/08* (2006.01)
*C01B 13/11* (2006.01)

(52) U.S. Cl.
CPC .............. *C01B 13/11* (2013.01); *C01B 2201/14* (2013.01); *C01B 2201/22* (2013.01); *C01B 2201/32* (2013.01); *C01B 2201/64* (2013.01); *C01B 2201/72* (2013.01)

(58) Field of Classification Search
CPC C01B 13/11; C01B 2201/14; C01B 2201/72; C01B 2201/32; C01B 2201/64; C01B 2201/22; C01B 2201/40; C01B 13/115; H01T 19/00

USPC ................................................... 422/186.07
See application file for complete search history.

(56) References Cited

U.S. PATENT DOCUMENTS 3,024,185 A    3/1962  Fleck
3,671,417 A *  6/1972  Louboutin ............... 422/186.18
(Continued)

FOREIGN PATENT DOCUMENTS

EP    0 818 415 A1    1/1998
EP    0 873 968 A1    10/1998
(Continued)

OTHER PUBLICATIONS

European Search Report issued in European Application No. 09845220.4 dated Apr. 19, 2013.

*Primary Examiner* — Xiuyu Tai
(74) *Attorney, Agent, or Firm* — Sughrue Mion, PLLC; Richard C. Turner

(57) ABSTRACT

There is provided an ozone generating apparatus that requires no use of cooling water, is small in size and easy in maintenance. The ozone generating apparatus includes a ground electrode 1 formed of a substantially cylindrical metal tube, and a high voltage electrode 5 having a substantially cylindrical dielectric body substantially concentrically arranged inside the ground electrode, and having a high voltage applied to an electrically conductive layer 6 formed on an inner peripheral surface thereof, in which an oxygen-containing gas is supplied into an electric discharge gap formed between the ground electrode and the high voltage electrode to generate ozone, wherein the ground electrode is formed integrally with plural air cooling fins 2 extending in a longitudinal direction at an outer peripheral side thereof.

8 Claims, 5 Drawing Sheets

(56) References Cited

U.S. PATENT DOCUMENTS

| | | | |
|---|---|---|---|
| 3,825,870 A * | 7/1974 | Ono et al. | 337/159 |
| 4,504,446 A * | 3/1985 | Kunicki et al. | 422/186.19 |
| 5,437,843 A * | 8/1995 | Kuan | 422/186.18 |
| 5,549,874 A * | 8/1996 | Kamiya et al. | 422/186.04 |
| 5,879,641 A * | 3/1999 | Conrad et al. | 422/186.07 |
| 5,942,196 A | 8/1999 | Tabata et al. | |
| 6,599,486 B1 * | 7/2003 | Borgstrom | 422/186.07 |
| 6,994,832 B2 * | 2/2006 | Borgstrom | 422/186.19 |

FOREIGN PATENT DOCUMENTS

| | | |
|---|---|---|
| JP | 57-017405 A | 1/1982 |
| JP | 60-060904 A | 4/1985 |
| JP | 8-245203 A | 9/1996 |
| JP | 10-025104 A | 1/1998 |
| JP | 10-139404 A | 5/1998 |

* cited by examiner

CURRENT AND OZONE CONCENTRATION($N_2$=0.2%, TEMPERATURE 8.2~11.2°C)

ELECTRIC POWER AND OZONE YIELD ($N_2$=0.2%, TEMPERATURE 8.2~11.2°C)

OZONE GENERATING APPARATUS

CROSS REFERENCE TO RELATED APPLICATIONS

This application is a National Stage of International Application No. PCT/JP2009/059795 filed May 28, 2009, the contents of all of which are incorporated herein by reference in their entirety.

TECHNICAL FIELD

The present invention relates to an ozone generating apparatus that generates an ozonized gas due to electric discharge.

BACKGROUND ART

An ozone generating apparatus includes a ground electrode formed of a metal tube, an electrode having an electrically conductive layer formed on an inner surface of a cylindrical glass tube (dielectric body), and a high voltage electrode disposed on an inner diameter portion of the glass tube. An oxygen-containing gas is supplied to a gap between an inner side of the metal tube and an outer side of the glass tube. A high voltage is applied to the ground electrode and the high voltage electrode to generate an ozonized gas due to electric discharge (refer to Patent Document 1).

PRIOR ART DOCUMENT

Patent Document

Patent Document 1: JP-A-8-245203

DISCLOSURE OF THE INVENTION

Problem to be Solved by the Invention

In such an ozone generating apparatus, when ozone is generated due to electric discharge, the ground electrode, the high voltage electrode, and its neighborhood are heated, thereby rising in temperature. Because the temperature rise deteriorates the efficiency of the ozone generation, a structure is applied in which a cooling water passes along an outer peripheral portion of the ground electrode to cool an electric discharge portion.

However, the structure requiring the cooling water makes it difficult to downsize the ozone generating apparatus. When ozone is generated, the cooling water needs to be ensured. In addition, there arises such a problem that water is leaked due to corrosion of a cooling system in a long run.

The present invention has been made to solve the above problems, and aims at providing an ozone generating apparatus that requires no use of cooling water, is small in size and easy in maintenance.

Means for Solving the Problem

According to the present invention, there is provided an ozone generating apparatus including a ground electrode formed of a substantially cylindrical metal tube, and a high voltage electrode having a substantially cylindrical dielectric body substantially concentrically arranged inside the ground electrode, and having a high voltage applied to an electrically conductive layer formed on an inner peripheral surface thereof, in which an oxygen-containing gas is supplied into an electric discharge gap formed between the ground electrode and the high voltage electrode to generate ozone, wherein the ground electrode is formed integrally with plural air cooling fins extending in a longitudinal direction at an outer peripheral side thereof.

Effects of the Invention

According to the present invention, since the ground electrode is formed integrally with the air cooling fins, there can be obtained a cooling ozone generating apparatus that requires no use of cooling water, is small in size, easy in processing and low in costs.

BEST MODES FOR CARRYING OUT THE INVENTION

Figure 1:
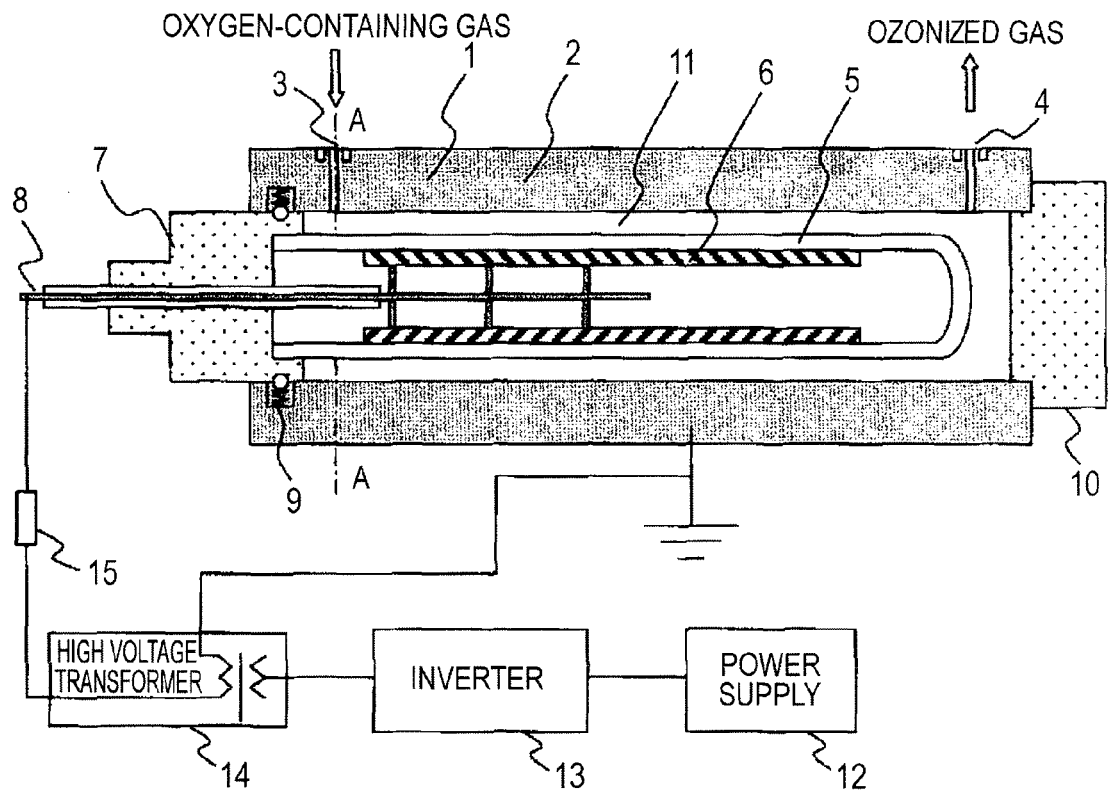
FIG. 1 is a cross-sectional configuration view illustrating an ozone generating apparatus according to a first embodiment of the present invention.

Embodiments of the present invention will be described in detail with reference to the drawing.

First Embodiment

Figure 2:
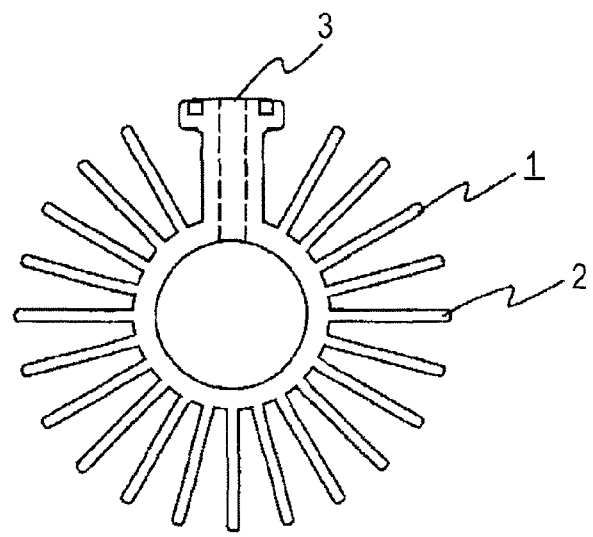
FIG. 2 is a cross-sectional view of a ground electrode taken along a line A-A in FIG. 1.

FIG. 1 is a cross-sectional configuration view illustrating an ozone generating apparatus according to a first embodiment of the present invention, and FIG. 2 is a cross-sectional view of a ground electrode taken along a line A-A in FIG. 1.

Referring to FIGS. 1 and 2, reference numeral 1 denotes a ground electrode formed of a substantially cylindrical metal tube having plural air cooling fins 2 extending radially in a longitudinal direction of an outer peripheral side thereof (refer to FIG. 2). The air cooling fins 2 are formed integrally with the ground electrode 1 by aluminum extrusion. One end of the ground electrode 1 is provided with a raw gas inlet hole 3, and the other end thereof is provided with an ozonized gas outlet hole 4. The ground electrode 1 is structured so that an inner surface thereof is subjected to oxide coating to protect an underlying metal.

Reference numeral 5 denotes a high voltage electrode that is substantially concentrically disposed inside the ground electrode 1, and configured by a substantially cylindrical dielectric body (glass tube). An electrically conductive layer 6 of metal plating to which a high voltage is applied is formed on an inner peripheral surface thereof.

Reference numeral 7 denotes an insulating member made of polytetrafluoroethylene or Teflon (registered trademark)

that is fixed to one end of the high voltage electrode 5. A high voltage electrode member 8 that penetrates through a center portion of the insulating member 7 and applies a high voltage to the electrically conductive layer 6 is supported by the insulating member 7. The insulating member 7 is held to the ground electrode 1 through a movable sealing portion 9 disposed on one end of the ground electrode 1 at the raw gas inlet hole 3 side. The movable sealing portion 9 contracts when the insulating member 7 is inserted or detached. After the insulating member 7 has been inserted or detached, the movable sealing portion 9 seals a gap between the insulating member 7 and the ground electrode 1 due to an elastic rebound operation. Reference numeral 10 denotes an insulating sealing member made of Teflon (registered trademark) that seals another end of the ground electrode 1 at the ozonized gas outlet hole 4 side. Reference numeral 11 denotes a gas flow path that is formed between the ground electrode 1 and the high voltage electrode 5, to which a dry air or a concentrated oxygen gas equal to or lower than a dewpoint of 40° C. is supplied from the raw gas inlet hole 3 disposed in the ground electrode 1.

Reference numeral 12 denotes a power supply, 13 is an inverter, and 14 is high voltage transformer that develops a high voltage, which configure a power supply device that applies the high voltage to the high voltage electrode member 8. After a voltage across the power supply 12 has been converted into a given AC frequency by the inverter 13, the voltage is boosted to the high voltage by the high voltage transformer 14, and then applied to the high voltage electrode member 8.

Reference numeral 15 denotes a visualization fuse that is connected between the high voltage transformer 14 and the high voltage electrode member 8, which is a low-melting-point fuse with a melting point of 217° C., covered with a transparent polytetrafluoroethylene (Teflon (registered trademark) tube. The material of the fuse 15 is an alloy containing Su, Ag, and Cu, and a fuse diameter is 100 μm.

In the ozone generating apparatus configured as described above, in a state where a cooling air flows along the air cooling fins 2 of the ground electrode 1, the concentrated oxygen gas having the drew point of 40° C. or lower, which is introduced from the raw gas inlet hole 3, is supplied, and an ozonized gas is generated due to electric discharge between the ground electrode 1 and the high voltage electrode 5, and then discharged from the ozonized gas outlet hole 4 to a use location.

The inner surface of the ground electrode 1 is oxidized by continuing electric discharge for generating ozone to form a coating for protecting the underlying metal. Alternatively, the inner surface of the ground electrode may be subjected to oxidation coating in advance to form a protective coating.

As described above, according to the first embodiment, in the ozone generating apparatus including the ground electrode formed of the substantially cylindrical metal tube, and the high voltage electrode 5 having the substantially cylindrical dielectric body substantially concentrically arranged inside the ground electrode 1, and having the high voltage applied to the electrically conductive layer formed on the inner peripheral surface thereof, in which the oxygen-containing gas is supplied into the electric discharge gap formed between the ground electrode 1 and the high voltage electrode 5 to generate ozone, the ground electrode 1 is formed integrally with the plural air cooling fins 2 extending in the longitudinal direction at the outer peripheral side thereof. Therefore, there can be obtained the ozone generating apparatus requiring no use of cooling water, small in the size, easy in processing, and low in costs.

Also, since the air cooling fins 2 are made of aluminum, and formed through extrusion, the air cooling fins 2 can be manufactured with high efficiency.

Further, since the ground electrode 1 has the inner surface of the underlying metal protected by oxidation coating, the durability can be ensured.

Further, the high voltage electrode 5 is configured by integrating the dielectric body with the high voltage electrode member 8, which is supported to the dielectric body through the insulating member 7 and applies the high voltage to the electrically conductive layer 6, and detachably held to the ground electrode 1. Therefore, attachment, detachment or exchange of the high voltage electrode 5 with respect to an apparatus main body can be performed with one-touch operation.

Further, since the high voltage electrode 5 is applied with the high voltage through the visualization fuse 15, the apparatus can be safely protected, and occurrence of a failure can be easily found out.

Second Embodiment

Figure 3:
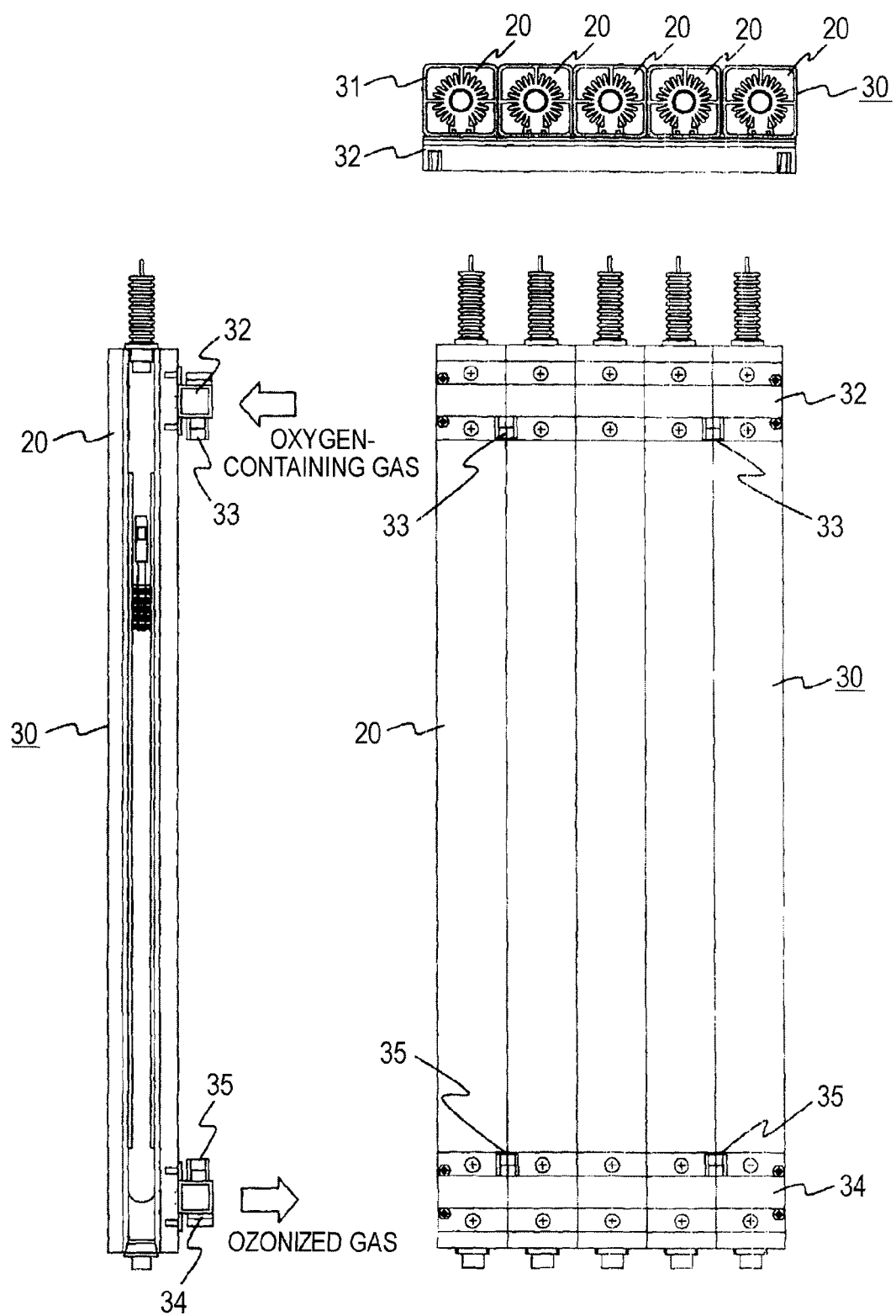
FIG. 3 is a three-sided view illustrating an ozone generating apparatus according to a second embodiment of the present invention.

FIG. 3 is a three-sided view illustrating an ozone generating apparatus according to a second embodiment of the present invention.

In the second embodiment, plural (five in the drawing) discharge tube units 20 each including the ground electrode 1 and the high voltage electrode 5 held integrally with the ground electrode 1 through the insulating member 7 in the ozone generating apparatus according to the first embodiment are assembled integrally into a discharge tube assembly 30 to configure a cooling ozone generating apparatus as a whole.

In the discharge tube assembly 30, each of the discharge tube units 20 is housed and fixed in a housing 31 forming a ventilating path, separately, and installed on a common base 32 in which raw gas inlets 33 are formed, and a common base 34 in which ozonized gas outlets 35 are formed, in parallel.

Also, although not shown, each of the discharge tube units 20 is applied with a high voltage from a power supply device including an inverter and a high voltage transformer, which are commonly provided, or a power supply device including an inverter and a high voltage transformer, which are provided for each of the discharge tube units 20.

According to the second embodiment, with provision of the discharge tube assembly 30 into which the discharge tube units 20 of the number required according to an ozone generation capacity are assembled integrally, the cooling ozone generating apparatus according to the ozone generation capacity can be easily configured.

Third Embodiment

Figure 4:
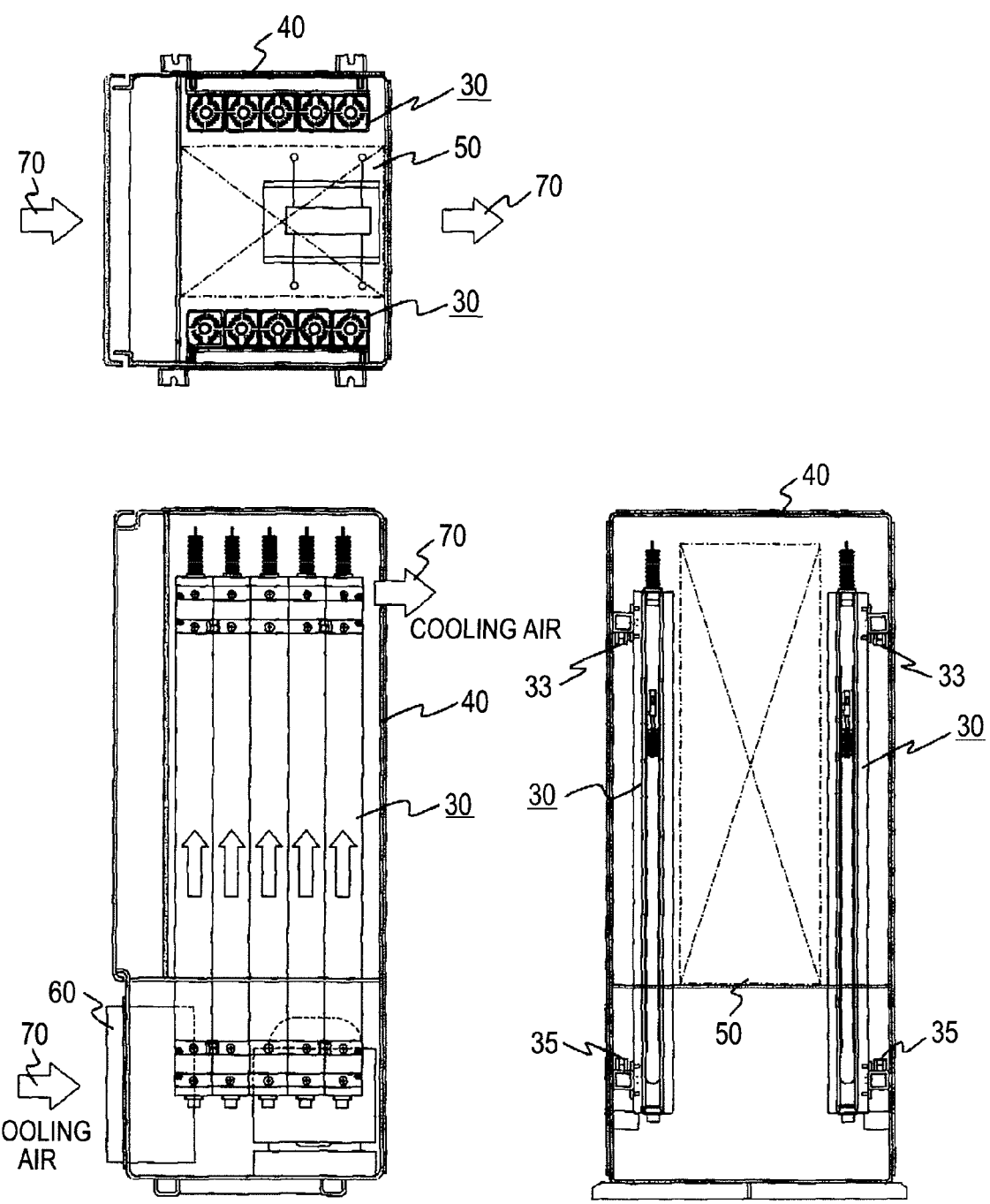
FIG. 4 is a three-sided view illustrating an ozone generating apparatus according to a third embodiment of the present invention.

FIG. 4 is a three-sided view illustrating an ozone generating apparatus according to a third embodiment of the present invention. Referring to FIG. 4, parts of a housing are deleted in a front view and a side view.

In the third embodiment, plural sets of the discharge tube assemblies 30 (two sets in the drawing) in the ozone generating apparatus according to the second embodiment are used to configure the cooling ozone generating apparatus as a whole.

Each of the discharge tube assemblies 30 is fixedly disposed perpendicularly along each of opposed inner side walls of a common housing 40, and a power supply device 50 having an inverter and a high voltage transformer is disposed in the center of the housing 40. A cooling air 70 is fed to the respective discharge tube assemblies 30 by a fan 60 located on a lower portion of the housing 40 to cool the discharge tube units 20.

The cooling air 70 is divided into the discharge tube units 20 of the respective discharge tube assemblies 30 from the lower portion of the housing 40, and discharged to the external from an upper portion of the housing 40.

In the ozone generating apparatus configured as described above, an oxygen concentrated gas of a dew point 40° C. or lower, which is introduced from the raw gas inlets 33, is supplied to the discharge tube units 20 of the respective discharge tube assemblies 30. The ozonized gas is generated by electric discharge between the ground electrode 1 and the high voltage electrode 5, and then discharged from the ozonized gas outlets 35 to the use location.

In the ozone generating apparatus, an electric discharge power for generating ozone of 100 g/h is about 0.9 kW, air of about 5 m³/min is fed from the fan 60, and the discharge tube units 20 are cooled to a temperature difference of about 10° C. from the ambient environment.

Figure 5:
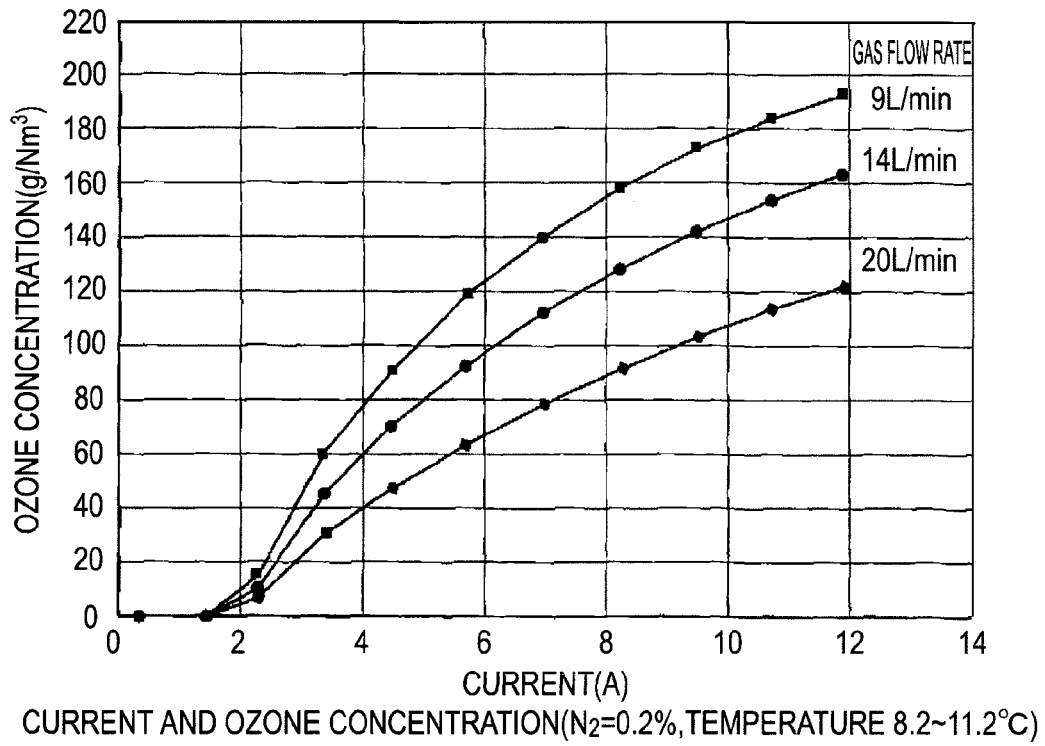
FIG. 5 is a characteristic diagram illustrating an example of a performance of the ozone generating apparatus according to the third embodiment.
Figure 6:
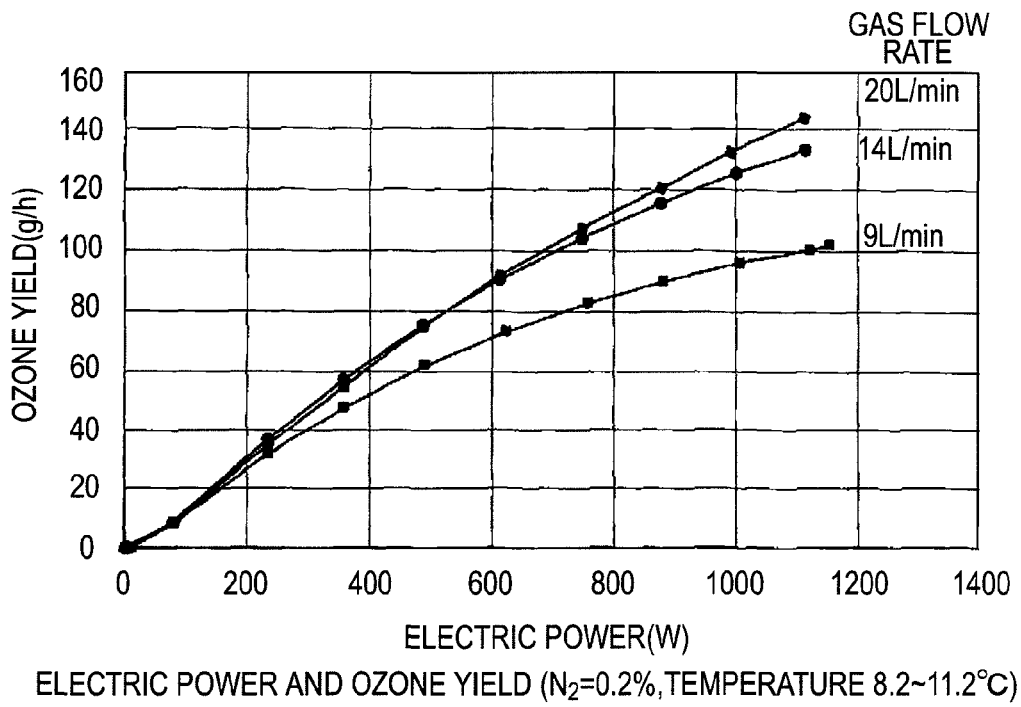
FIG. 6 is a characteristic diagram illustrating an example of the performance of the ozone generating apparatus according to the third embodiment.
Figure 7:
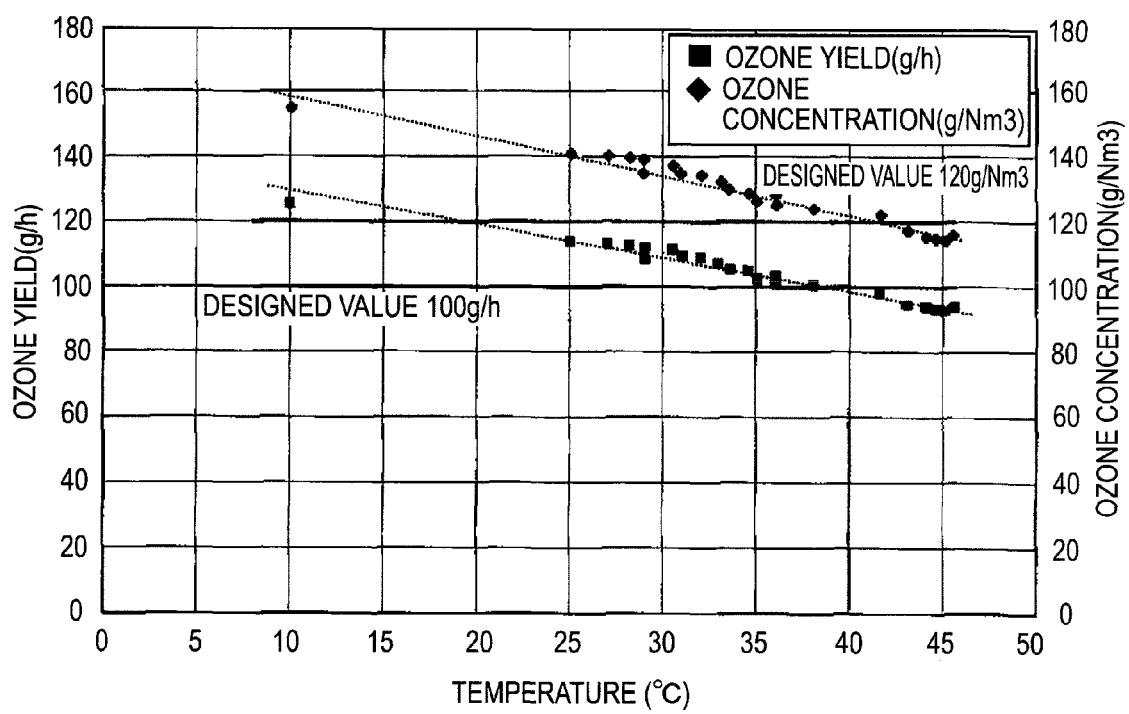
FIG. 7 is a characteristic diagram illustrating an example of the performance of the ozone generating apparatus according to the third embodiment.

Relationships between an ozone yield thus obtained, electric characteristics, and atmospheric temperature dependency are shown in FIGS. 5 to 7.

FIG. 5 is a diagram illustrating a relationship between a current and an ozone concentration in gas flow rates 20 L/min, 14 L/min, and 9 L/min. As the current is larger or as the gas flow rate is smaller, the ozone concentration becomes higher, and the maximum concentration is 190 g/Nm³.

FIG. 6 is a diagram illustrating a relationship between the electric discharge power and the ozone yield in the gas flow rates 20 L/min, 14 L/min, and 9 L/min.

As the electric discharge power is larger or as the gas flow rate is larger, the ozone yield increases, and the maximum value thereof is 140 g/h.

FIG. 7 is a diagram illustrating the atmospheric temperature dependency of the ozone generation performance. FIG. 7 shows a tendency that the ozone generation performance becomes lower as the atmospheric temperature is higher, and indicates that a designed value is cleared even under a high temperature of 40° C. to withstand the normal use.

The above respective characteristics are obtained in a case where the high voltage is applied to the five discharge tube units 20 configuring each discharge tube assembly 30 by the common power supply device. Even when the power supply device is provided for each of the discharge tube units 20, individually, the ozone generation concentration and the ozone yield per one discharge tube unit are substantially identical with those in the former case.

According to the third embodiment, the plural sets of the discharge tube assemblies 30 in which the plural discharge tube units 20 are assembled integrally are used, and housed in the common housing 40 together with the power supply device 50 including the inverter and the high voltage transformer, and the cooling air is supplied from the external. As a result, the cooling ozone generating apparatus corresponding to the ozone generation capacity can be configured with a small size.

INDUSTRIAL APPLICABILITY

The ozone generating apparatus according to the present invention can be effectively used as means for generating the ozonized gas in a water treatment installation.

DESCRIPTION OF SYMBOLS

1: ground electrode
2: air cooling fin
3: raw gas inlet hole
4: ozonized gas outlet hole
5: high voltage electrode
6: electrically conductive layer
7: insulating member
8: high voltage electrode member
9: movable sealing portion
10: insulating sealing member
11: gas flow path
12: power supply
13: inverter
14: high voltage transformer
15: visualization fuse
20: discharge tube unit
30: discharge tube assembly
31: housing
32: base
33: raw gas inlet
34: base
35: ozonized gas outlet
40: housing
50: power supply device
60: fan
70: cooling air

The invention claimed is:

1. An ozone generating apparatus, the apparatus comprising:
a ground electrode formed of a substantially cylindrical metal tube, and
a high voltage electrode having a substantially cylindrical dielectric body substantially concentrically arranged inside the ground electrode, and configured to have a high voltage applied to an electrically conductive layer formed on an inner peripheral surface thereof, in which an oxygen-containing gas is supplied from a raw gas inlet into an electric discharge gap formed between the ground electrode and the high voltage electrode to generate ozone,
wherein the ground electrode is formed integrally with plural air cooling fins extending in a longitudinal direction at an outer peripheral side thereof,
the high voltage electrode integrates the dielectric body with a high voltage electrode member connected to the electrically conductive layer and applying the high voltage, and is held into the ground electrode to configure a discharge tube unit together with the ground electrode,
a plurality of the discharge tube units are provided,
the plurality of discharge tube units are separately housed and fixed in respective housings forming ventilating paths connected to an inlet for providing cooling air to the plural air cooling fins, the cross sections of the housings being a rectangular shape,
the ventilating paths for the plurality of discharge tube units are independent of each other, and the cooling air flows therethrough separately to the respective discharge tube units, and
the cooling air is provided from a source different from the oxygen-containing gas.

2. The ozone generating apparatus according to claim 1, wherein the air cooling fins are made of aluminum, and formed through extrusion.

3. The ozone generating apparatus according to claim 1, wherein the ground electrode has an inner surface of an underlying metal protected by oxidation coating.

4. The ozone generating apparatus according to claim 1, wherein the high voltage electrode is configured by integrating the dielectric body with the high voltage electrode member, which is supported to the dielectric body through an insulating sealing member and applies the high voltage to the electrically conductive layer, and detachably held to the ground electrode.

5. The ozone generating apparatus according to claim 4, wherein the high voltage electrode is applied with the high voltage through a visualization fuse.

6. The ozone generating apparatus according to claim 1, wherein the discharge tube units are integrally assembled into a discharge tube assembly in a common housing forming a common ventilating path, and a power supply device including an inverter and a high voltage transformer, which apply the high voltage to the discharge tube units are housed in the common housing, and the cooling air is supplied to the respective discharge tube units from external of the common housing.

7. The ozone generating apparatus according to claim 1, wherein the discharge tube units are applied with the high voltage from a power supply device including an inverter and a high voltage transformer, which are provided commonly to the plurality of discharge tube units.

8. The ozone generating apparatus according to claim 1, wherein each of the discharge tube units is applied with the high voltage from a power supply device including an inverter and a high voltage transformer, which are provided for each of the plurality of discharge tube units.

* * * * *